United States Patent
Yeh

(10) Patent No.: US 8,230,160 B2
(45) Date of Patent: Jul. 24, 2012

(54) FLASH MEMORY STORAGE SYSTEM AND FLASH MEMORY CONTROLLER AND DATA PROCESSING METHOD THEREOF

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 313 days.

(21) Appl. No.: 12/636,043

(22) Filed: Dec. 11, 2009

(65) Prior Publication Data

US 2011/0099324 A1     Apr. 28, 2011

(30) Foreign Application Priority Data

Oct. 28, 2009 (TW) ................................ 98136515 A

(51) Int. Cl.
    *G06F 12/00*      (2006.01)
(52) U.S. Cl. ......... 711/103; 711/170; 711/202; 711/221
(58) Field of Classification Search .................. None
See application file for complete search history.

(56) References Cited

U.S. PATENT DOCUMENTS

2006/0184720 A1*    8/2006    Sinclair et al. ............... 711/103

FOREIGN PATENT DOCUMENTS

| CN | 101027651 A | 8/2007 |
| CN | 101354715 A | 1/2009 |

OTHER PUBLICATIONS

"First Office Action of China Counterpart Application", issued on Dec. 16, 2011, p. 1-p. 8, in which the listed references were cited.

* cited by examiner

*Primary Examiner* — Shawn X Gu
(74) *Attorney, Agent, or Firm* — J. C. Patents

(57) ABSTRACT

A flash memory storage system including a flash memory chip, a connector, and a flash memory controller is provided. The flash memory controller configures a plurality of logical addresses and maps the logical addresses to a part of the physical addresses in the flash memory chip, and a host system uses a file system to access the logical addresses. Besides, the flash memory controller identifies a deleted logical address among the logical addresses and marks data in the physical address mapped to the deleted logical address as invalid data.

22 Claims, 13 Drawing Sheets

FLASH MEMORY STORAGE SYSTEM AND FLASH MEMORY CONTROLLER AND DATA PROCESSING METHOD THEREOF

CROSS-REFERENCE TO RELATED APPLICATION

This application claims the priority benefit of Taiwan application serial no. 98136515, filed on Oct. 28, 2009. The entirety of the above-mentioned patent application is hereby incorporated by reference herein and made a part of specification.

BACKGROUND

1. Technology Field

The present invention generally relates to a flash memory storage system, and more particularly, to a flash memory storage system that can identify data deleted by a host system in a flash memory and a flash memory controller and a data processing method thereof.

2. Description of Related Art

Along with the widespread of digital cameras, cell phones, and MP3 in recently years, the consumers' demand to storage media has increased drastically. Flash memory is one of the most adaptable memories for such battery-powered portable products due to its characteristics such as data non-volatility, low power consumption, small volume, and non-mechanical structure. A solid state drive (SSD) is a storage device which uses a NAND flash memory as its storage medium. Flash memory has been broadly used for storing important personal data thanks to its small volume and large capacity. Thereby, the flash memory industry has become a very important part of the electronic industry in recent years.

The flash memory chip in a flash memory storage apparatus has a plurality of physical blocks, and each of the physical blocks has a plurality of physical pages, wherein each physical block is an erasing unit of the flash memory chip while each physical page is a writing unit of the flash memory chip. Because a flash memory chip can only be programmed (i.e., written) in a single direction (i.e., the value of a memory cell thereof can only be programmed from 1 to 0), data cannot be directly written into a physical page that has been programmed before (i.e., a page contains data). Instead, the physical page has to be erased first before it can be programmed. In particular, since a flash memory chip is erased in unit of physical blocks, when a physical page containing old data is to be erased, the entire physical block corresponding to the physical page has to be erased. Since a flash memory is written in unit of physical pages while erased in unit of physical blocks, physical blocks in the flash memory are logically grouped into a system area, a data area, a spare area, and a replacement area by a flash memory controller of the flash memory storage apparatus. The physical blocks in the system area are used for storing important information related to the flash memory storage apparatus, and the physical blocks in the replacement area are used for replacing damaged physical blocks (i.e., bad blocks) in the data area or the spare area. Thus, a host system cannot access the physical blocks in the system area and the replacement area in a general access state. The physical blocks in the data area are used for storing valid data written by write commands, and the physical blocks in the spare area are used for substituting the physical blocks in the data area when the write commands are executed. To be specific, when a flash memory storage apparatus receives a write command from a host system and accordingly is about to write data into a physical block in the data area, the flash memory storage apparatus selects a physical block from the spare area and writes the old valid data in the physical block in the data area and the new data into the physical block selected from the spare area. Then, the flash memory storage apparatus logically links the physical block containing the new data to the data area and erases the original physical block in the data area and logically links it to the spare area. The flash memory storage apparatus provides logical addresses to the host system in order to allow the host system to smoothly access the physical blocks alternatively used for storing data. Namely, the flash memory storage apparatus reflects the alternation of the physical blocks by recording and updating the mapping relationship between the logical addresses and the physical blocks in the data area in a logical address-physical address mapping table. Thus, the host system simply writes data into a logical address while the flash memory storage apparatus accesses the corresponding physical address according to the logical address-physical address mapping table.

Generally speaking, a host system uses a file system to manage a peripheral storage device (for example, aforementioned flash memory storage apparatus) connected to the host system. When the host system is about to delete data previously stored in the peripheral storage device, the host system only updates the space information of the file system but does not instruct the peripheral storage device to actually delete the data. Thus, the control circuit of the peripheral storage device cannot get to know the data in which physical addresses is already deleted by the host system. In particular, taking the flash memory storage apparatus described above as an example, since the flash memory controller of the flash memory storage apparatus cannot determine whether the data in each physical address is already deleted by the host system or not, when the flash memory controller manages the physical blocks in the flash memory chip in the alternative pattern described above, it has to spend a lot of time to maintain the data already deleted by the host system. As a result, the write speed and efficiency of the flash memory storage apparatus are seriously affected.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

Accordingly, the present invention is directed to a flash memory storage system that can identify data deleted by a host system.

The present invention is directed to a flash memory controller that can identify data deleted by a host system.

The present invention is directed to a data processing method that can identify data deleted by a host system.

According to an exemplary embodiment of the present invention, a flash memory storage system including a flash memory chip, a connector, and a flash memory controller is provided. The flash memory chip has a plurality of physical blocks, and each of the physical blocks has a plurality of physical addresses. The connector is configured for coupling to a host system. The flash memory controller is coupled to the flash memory chip and the connector. The flash memory controller configures a plurality of logical addresses and maps the logical addresses to a part of the physical addresses. The host system uses a file system to access the logical addresses, wherein the file system includes at least one file system space information. Besides, the flash memory controller identifies a deleted logical address among the logical addresses and marks data in the physical address mapped to the deleted logical address as invalid data, wherein data stored in the deleted logical address is already deleted in the file system space information.

According to an exemplary embodiment of the present invention, a flash memory controller is provided. The flash memory controller is configured in a flash memory storage apparatus for managing a flash memory chip of the flash memory storage apparatus, wherein the flash memory chip has a plurality of physical blocks, and each of the physical blocks has a plurality of physical addresses. The flash memory storage apparatus is coupled to a host system. The flash memory controller includes a microprocessor unit, a flash memory interface unit, a host interface unit, and a memory management unit. The flash memory interface unit is coupled to the microprocessor unit and configured for coupling to the flash memory chip. The host interface unit is coupled to the microprocessor unit and configured for coupling to the host system. The memory management unit is coupled to the microprocessor unit, and the memory management unit configures a plurality of logical addresses and maps the logical addresses to a part of the physical addresses. The host system uses a file system to access the logical addresses, wherein the file system includes at least one file system space information. Besides, the memory management unit identifies a deleted logical address among the logical addresses and marks data in the physical address mapped to the deleted logical address as invalid data, wherein data stored in the deleted logical address is already deleted in the file system space information.

According to an exemplary embodiment of the present invention, a data processing method for managing a flash memory chip is provided, wherein the flash memory chip has a plurality of physical blocks, and each of the physical blocks has a plurality of physical addresses. The data processing method includes providing a flash memory controller, configuring a plurality of logical addresses, and mapping the logical addresses to a part of the physical addresses, wherein a host system uses a file system to access the logical addresses, and the file system includes at least one file system space information. The data processing method also includes identifying a deleted logical address among the logical addresses and marking data in the physical address mapped to the deleted logical address as invalid data by using the flash memory controller, wherein data stored in the deleted logical address is already deleted in the file system space information.

As described above, the flash memory storage apparatus provided in exemplary embodiments of the present invention can identify data that is already deleted by a host system. Thereby, the write speed and efficiency of the flash memory storage apparatus are effectively improved.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
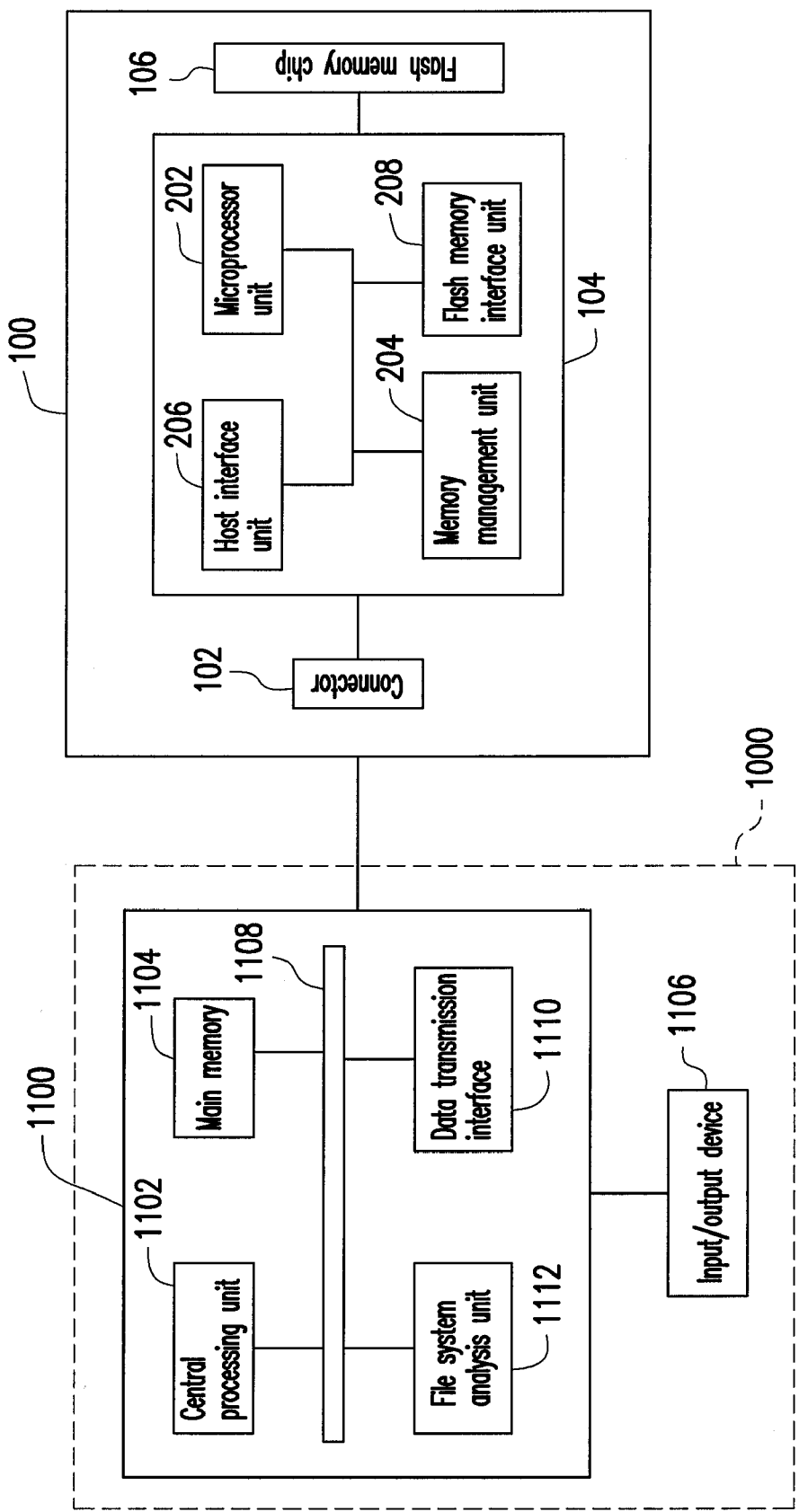
FIG. 1A is a schematic block diagram of a host system and a flash memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A flash memory storage apparatus usually includes a flash memory chip and a controller (also referred to as a control circuit). A flash memory storage apparatus is usually used together with a host system so that the host system can write data into or read data from the flash memory storage apparatus. In addition, a flash memory storage apparatus may also include an embedded flash memory and a software that can be executed by a host system and served as a controller of the embedded flash memory.

[First Exemplary Embodiment]

FIG. 1A is a schematic block diagram of a host system and a flash memory storage apparatus according to the first exemplary embodiment of the present invention.

Figure 1B:
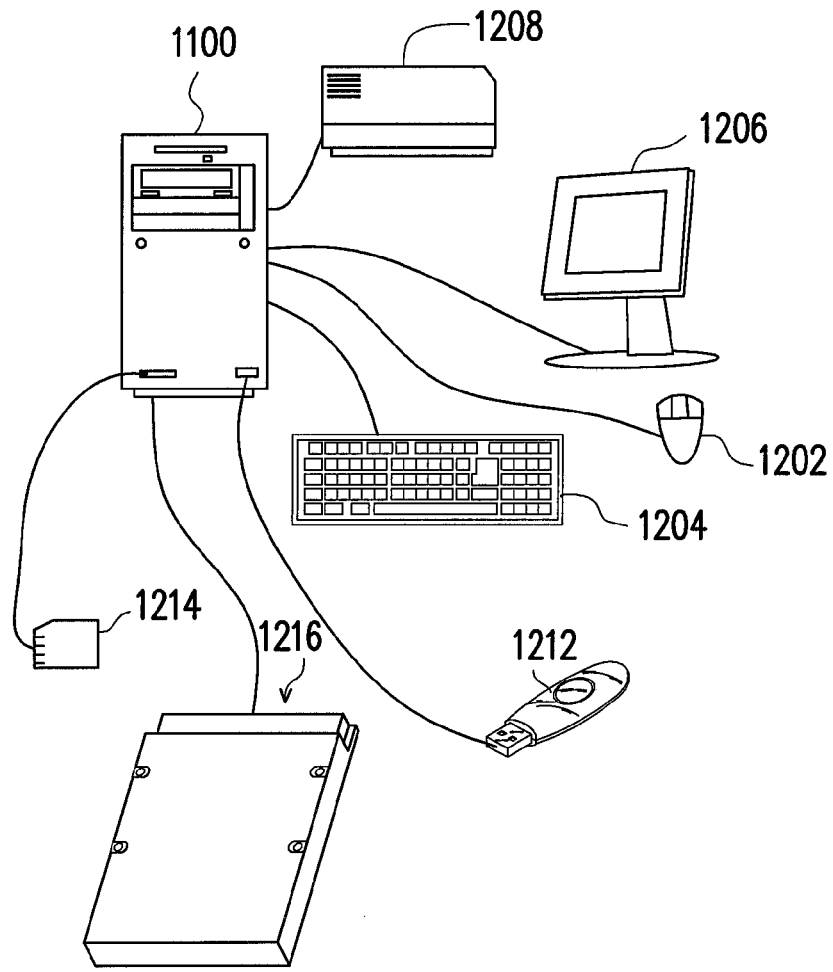
FIG. 1B is a schematic diagram of a computer, an input/output (I/O) device, and a flash memory storage apparatus according to an exemplary embodiment of the present invention.

Referring to FIG. 1A, the host system 1000 includes a computer 1100 and an input/output (I/O) device 1106. The computer 1100 includes a central processing unit (CPU) 1102, a main memory 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the scope of the I/O device 1106, and the I/O device 1106 may further include other devices.

In the present embodiment, a flash memory storage apparatus 100 is coupled to other devices of the host system 1000 through the data transmission interface 1110. The host system 1000 can write data into or read data from the flash memory storage apparatus 100 through the CPU 1102, the main memory 1104, and the I/O device 1106. The flash memory storage apparatus 100 may be a flash drive 1212, a memory card 1214, or a solid state drive (SSD) 1216, as shown in FIG. 1B.

Figure 1C:
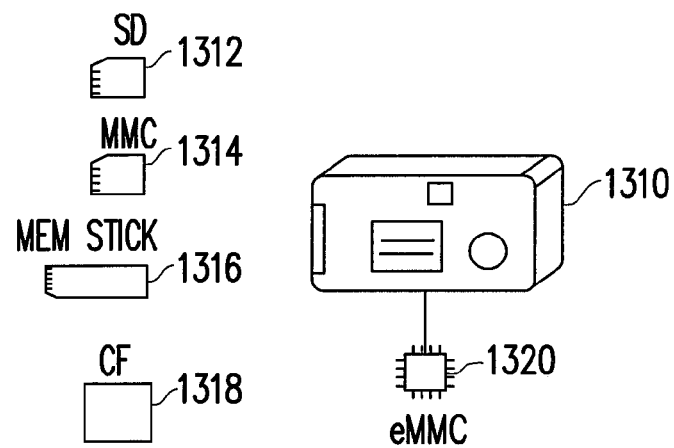
FIG. 1C is a schematic diagram of a host system and a flash memory storage apparatus according to another exemplary embodiment of the present invention.

Generally speaking, the host system 1000 may be any system that can store data. Even though the host system 1000 is described as a computer system in the present exemplary embodiment, in another exemplary embodiment of the present invention, the host system 1000 may also be a digital camera, a video camera, a communication device, an audio player, or a video player. For example, if the host system 1000 is a digital camera 1310, the flash memory storage apparatus 100 is then a SD card 1312, a MMC card 1314, a memory stick 1316, a CF card 1318, or an embedded storage device 1320 used in the digital camera 1310 (as shown in FIG. 1C), wherein the embedded storage device 1320 includes an embedded MMC (eMMC). It should be mentioned that the eMMC is directly coupled to a substrate of the host system 1000.

The flash memory storage apparatus 100 includes a connector 102, a flash memory controller 104, and a flash memory chip 106.

The connector 102 is coupled to the flash memory controller 104 and configured for coupling to the host system 1000. In the present exemplary embodiment, the connector 102 is a serial advanced technology attachment (SATA) connector. However, the present invention is not limited thereto, and the connector 102 may also be a parallel advanced technology attachment (PATA) connector, a universal serial bus (USB) connector, an Institute of Electrical and Electronic Engineers (IEEE) 1394 connector, a peripheral component interconnect (PCI) express connector, a secure digital (SD) interface connector, a memory stick (MS) interface connector, a multi media card (MMC) interface connector, a compact flash (CF) interface connector, an integrated device electronics (IDE) connector, or other suitable connectors.

The flash memory controller 104 executes a plurality of logic gates or control instructions implemented in a hardware form or a firmware form, so as to perform operations of writing, reading or erasing data in the flash memory chip 106 according to instructions of the host system 1000. The flash memory controller 104 includes a microprocessor unit 202, a memory management unit 204, a host interface unit 206, and a flash memory interface unit 208.

The microprocessor unit 202 is the main control unit of the flash memory controller 104, and cooperates with the memory management unit 204, the host interface unit 206, and the flash memory interface unit 208 to carry out various operations of the flash memory storage apparatus 100.

The memory management unit 204 is coupled to the microprocessor unit 202, and executes a data writing and processing mechanism and a memory management mechanism according to the present exemplary embodiment. The operations of the memory management unit 204 will be described below in detail.

In the present exemplary embodiment, the memory management unit 204 is implemented in the flash memory controller 104 as a firmware form. For example, the memory management unit 204 including a plurality of control instructions is burned into a program memory (for example, a read only memory (ROM)), and the program memory is embedded into the flash memory controller 104. When the flash memory storage apparatus 100 is in operation, the control instructions of the memory management unit 204 are executed by the microprocessor unit 202 to accomplish the data writing and processing mechanism and the memory management mechanism according to embodiments of the present invention.

In another exemplary embodiment of the present invention, the control instructions of the memory management unit 204 may also be stored in a specific area (for example, the system area of a flash memory chip exclusively used for storing system data) of the flash memory chip 106 as program codes. Similarly, the control instructions of the memory management unit 204 are executed by the microprocessor unit 202 when the flash memory storage apparatus 100 is in operation. In yet another exemplary embodiment of the present invention, the memory management unit 204 may also be implemented in the flash memory controller 104 as hardware form.

The host interface unit 206 is coupled to the microprocessor unit 202, and receives and identifies commands and data received from the host system 1000. Namely, the commands and data received from the host system 1000 are transmitted to the microprocessor unit 202 through the host interface unit 206. In the present exemplary embodiment, the host interface unit 206 is a SATA interface corresponding to the connector 102. However, it should be understood that the present invention is not limited thereto, and the host interface unit 206 may also be a PATA interface, a USB interface, an IEEE 1394 interface, a PCI express interface, a SD interface, a MS interface, a MMC interface, a CF interface, an IDE interface, or other suitable data transmission interfaces.

The flash memory interface unit 208 is coupled to the microprocessor unit 202 and configured for accessing the flash memory chip 106. Namely, data to be written into the flash memory chip 106 is converted by the flash memory interface unit 208 into a format acceptable to the flash memory chip 106.

Figure 2:
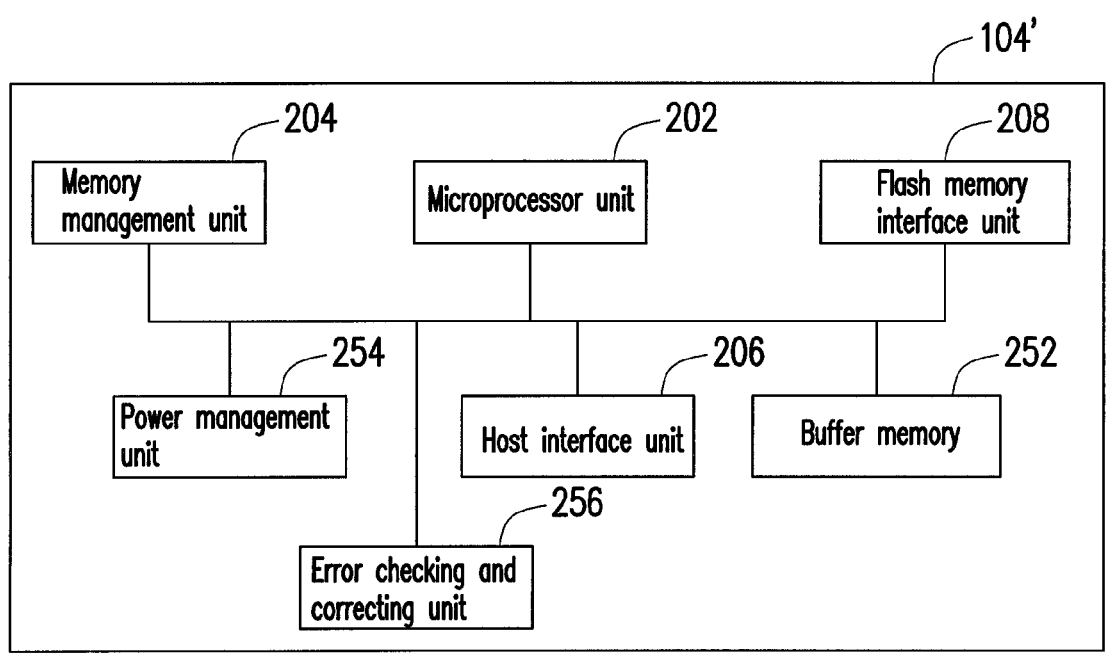
FIG. 2 is a schematic block diagram of a flash memory controller according to yet another exemplary embodiment of the present invention.

In another exemplary embodiment of the present invention, the flash memory controller may further include other functional modules. FIG. 2 is a schematic block diagram of a flash memory controller according to yet another exemplary embodiment of the present invention.

Referring to FIG. 2, besides the microprocessor unit 202, the memory management unit 204, the host interface unit 206, and the flash memory interface unit 208, the flash memory controller 104' further includes a buffer memory 252, a power management unit 254, and an error checking and correcting unit 256.

The buffer memory 252 is coupled to the microprocessor unit 202 and configured for temporarily storing data and commands received from the host system 1000 or data received from the flash memory chip 106.

The power management unit 254 is coupled to the microprocessor unit 202, and which controls the power supply of the flash memory storage apparatus 100.

The error checking and correcting unit 256 is coupled to the microprocessor unit 202, and executes an error correction procedure to ensure the data accuracy. To be specific, when the memory management unit 204 receives a host write command from the host system 1000, the error checking and correcting unit 256 generates an error checking and correcting (ECC) code for the data corresponding to the host write command, and the memory management unit 204 writes the data and the corresponding ECC code into the flash memory chip 106. When subsequently the memory management unit 204 reads the data from the flash memory chip 106, the memory management unit 204 simultaneously reads the corresponding ECC code, and the error checking and correcting unit 256 executes the error correction procedure on the data according to the ECC code.

Referring to FIG. 1A again, the flash memory chip 106 is coupled to the flash memory controller 104 and configured for storing data.

Figure 3A:
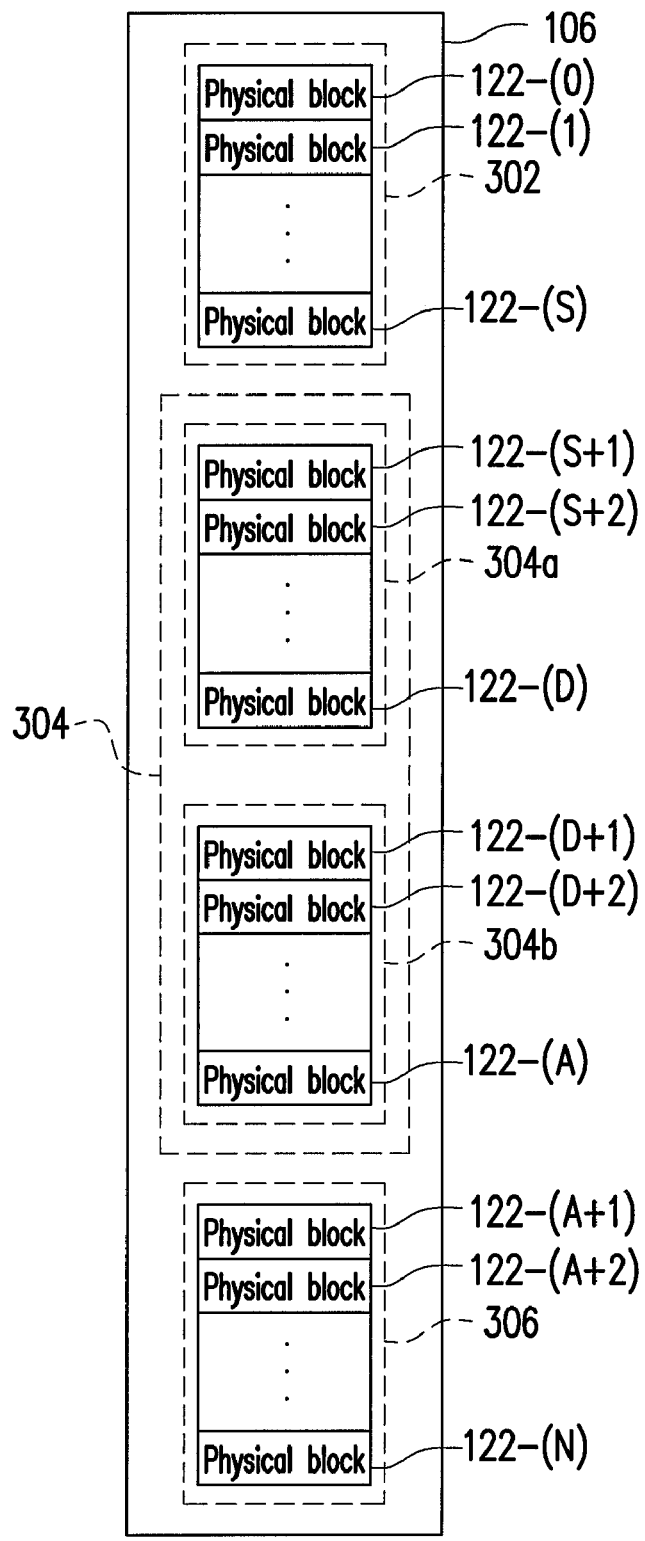
FIG. 3A is a schematic block diagram of a flash memory chip according to the first exemplary embodiment of the present invention.

FIG. 3A is a schematic block diagram of a flash memory chip according to the first exemplary embodiment of the present invention.

Referring to FIG. 3A, the flash memory chip 106 has physical blocks 122-(0)~122-(N). Each physical block is the smallest erasing unit (i.e., each physical block contains the least number of memory cells that are erased together). Each physical block has 128 physical addresses (i.e., physical pages). In the present exemplary embodiment, each physical address is the smallest programming unit (i.e., each physical address is the smallest unit for writing or reading data). Each physical page usually includes a user data area and a redundant area, wherein the user data area is used for storing user data, and the redundant area is used for storing system data (for example, the ECC code). However, it is not limited in the present invention that each physical block has 128 physical addresses. In another exemplary embodiment of the present invention, each physical block may also have 64, 256, or other suitable numbers of physical addresses. In the present exemplary embodiment, the flash memory chip 106 is a multi level cell (MLC) NAND flash memory chip. However, the present invention is not limited thereto, and the flash memory chip 106 may also be a single level cell (SLC) NAND flash memory chip.

The memory management unit 204 logically groups the physical blocks 122-(0)~122-(N) into a system area 302, a storage area 304, and a replacement area 306. It should be understood that the terms used herein for describing the operations (for example, "select", "replace", "group", and "alternate", etc) performed on the physical blocks of a flash memory refer to logical operations performed on these physical blocks. Namely, the physical blocks in the flash memory are only logically operated and the actual positions thereof are not changed.

The physical blocks 122-(0)~122-(S) logically belonging to the system area 302 are used for recording system data, such as the manufacturer and model of the flash memory chip and the number of physical addresses in each physical block.

The physical blocks 122-(S+1)~122-(A) logically belonging to the storage area 304 are used for storing data written by the host system 1000. Namely, the flash memory storage apparatus 100 uses the physical blocks in the storage area 304 for actually storing data written by the host system 1000. To be specific, the physical blocks 122-(S+1)~122-(A) in the storage area 304 are further grouped into a data area 304a and a spare area 304b, wherein the physical blocks 122-(S+1)~122-(D) in the data area 304a are physical blocks full of data, and the physical blocks 122-(D+1)~122-(A) in the spare area 304b are physical blocks containing no data. To be more specific, when the memory management unit 204 selects a physical block from the spare area 304b and writes data into the selected physical block, the selected physical block is linked to the data area 304a, and after the memory management unit 204 erases a physical block linked to the data area 304a, the erased physical block is linked to the spare area 304b.

The physical blocks 122-(A+1)~122-(N) logically belonging to the replacement area 306 are replacement physical blocks. For example, when the flash memory chip 106 is manufactured, 4% of its physical blocks are reserved for replacement purpose. Namely, when the physical blocks in the system area 302 and the storage area 304 are damaged, the physical blocks reserved in the replacement area 306 can be used for replacing the damaged physical blocks (i.e., bad blocks). Thus, if there are still available physical blocks in the replacement area 306 and a physical block is damaged, the memory management unit 204 selects an available physical block from the replacement area 306 for replacing the damaged physical block. If there is no more available physical block in the replacement area 306 and a physical block is damaged, the flash memory storage apparatus 100 is announced as being in a write-protect status and cannot be used for writing data anymore.

It has to be understood that the grouping relationships about which physical blocks belong to the system area 302, the data area 304a, the spare area 304b and the replacement area 306 among the physical blocks 122-(0)~122-(N) are dynamically changed during the operation of the flash memory storage apparatus 100. Namely, after the memory management unit 204 writes data into a physical block originally belonging to the spare area 304b (for example, the physical block 122-(D+2)), the physical block is linked to the data area 304a. Or, when a physical block in the data area 304a (or the spare area 304b) is damaged and accordingly replaced by a physical block selected from the replacement area 306, the physical block originally in the replacement area 306 is linked to the data area 304a (or the spare area 304b).

Figure 3B:
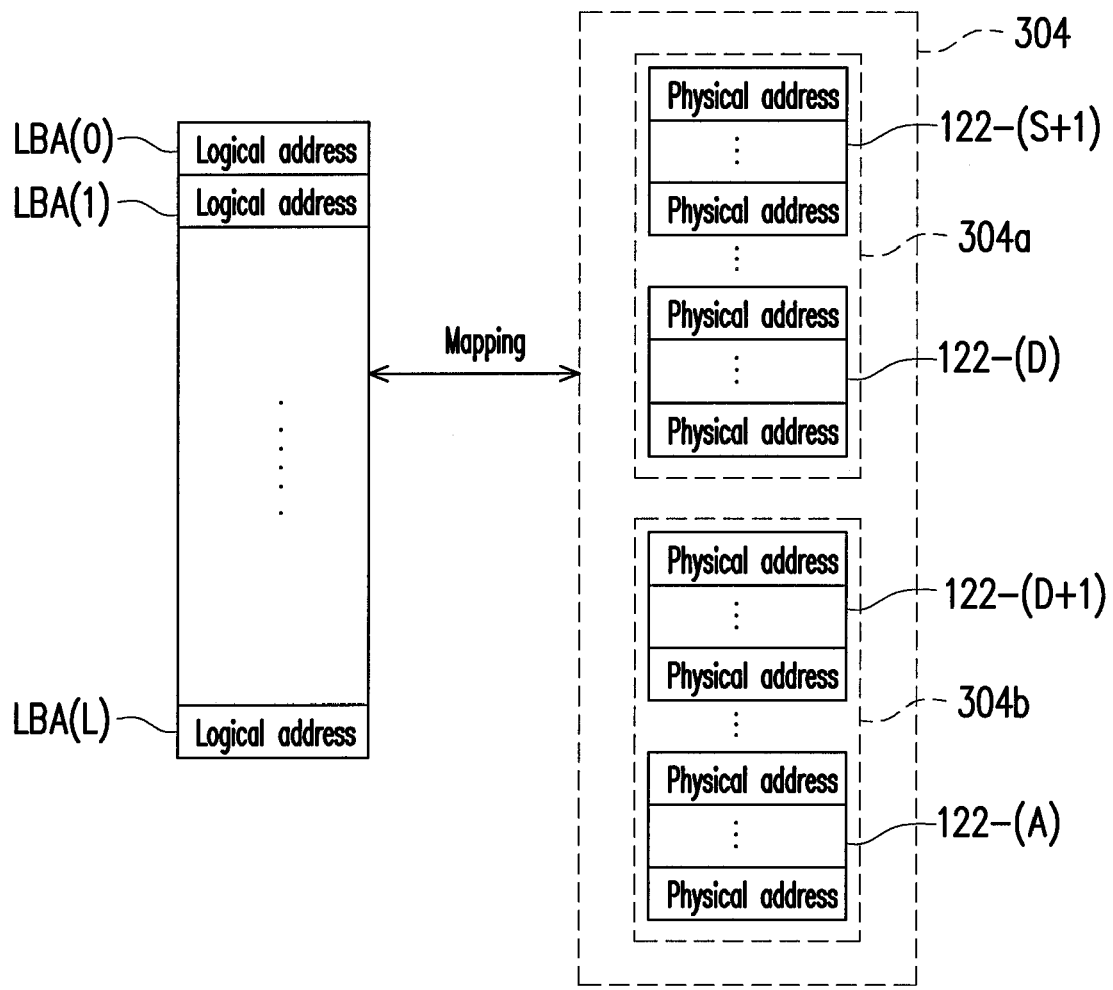
FIG. 3B illustrates the mapping relationships between logical addresses and physical addresses according to the first exemplary embodiment of the present invention.

Because the flash memory storage apparatus 100 alternatively uses the physical blocks in the storage area 304 for storing data written by the host system 1000, the memory management unit 204 provides logical addresses LBA(0)~LBA(L) to the host system 1000 and maps the logical addresses to the physical addresses of the physical blocks in the storage area 304 (as shown in FIG. 3B). For example, the memory management unit 204 maintains a logical address-physical address mapping table and a physical address-logical address mapping table for recording the mapping relationships between the logical addresses and the physical addresses.

In the present exemplary embodiment, when the flash memory storage apparatus 100 is coupled to the host system 1000 and initialized for the first time, the host system 1000 uses a file system to format the logical addresses LBA(0)~LBA(L) of the flash memory storage apparatus 100 and installs an operating system (not shown) into the logical addresses LBA(0)~LBA(L) of the flash memory storage apparatus 100. Meanwhile, the memory management unit 204 writes the file system space information and the operating system into the corresponding physical addresses according to write commands of the host system 1000. Subsequently, when the host system 1000 is re-started, the operating system is loaded and ran in the main memory 1104 to control the operation of the host system 1000, wherein the host system 1000 accesses the flash memory storage apparatus 100 according to the file system it uses. For the convenience of description, a file allocation table (FAT) file system will be taken as an example of the file system. However, the present invention is not limited thereto, and a NTFS file system or other file systems may also be applied to the present invention.

Figure 4:
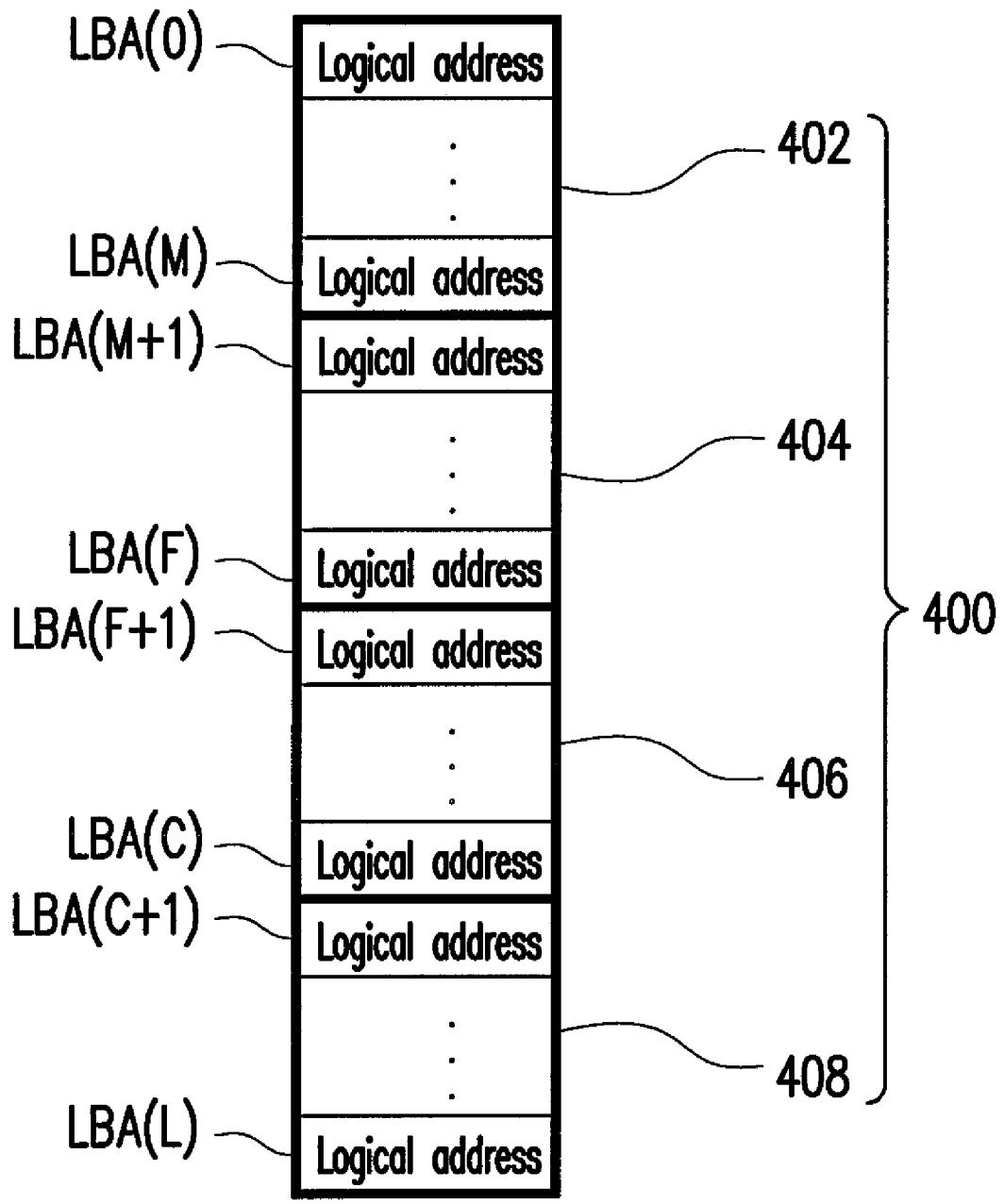
FIG. 4 illustrates an example of how a flash memory storage apparatus is formatted by using a file allocation table (FAT) file system according to the first exemplary embodiment of the present invention.

FIG. 4 illustrates an example of how a flash memory storage apparatus is formatted by using a FAT file system according to the first exemplary embodiment of the present invention.

Referring to FIG. 4, for example, when the host system 1000 uses a file system 400 to format the flash memory storage apparatus 100, the logical addresses LBA(0)~LBA(L) are sequentially grouped into a master boot record (MBR) 402, a FAT area 404, a directory area 406, and a file area 408, wherein the MBR 402, the FAT area 404, and the directory area 406 are used for storing space information of the FAT file system.

The logical addresses LBA(0)~LBA(M) of the MBR 402 are used for storing system information about the storage space of the flash memory storage apparatus 100.

The logical addresses LBA(M+1)~LBA(F) of the FAT area 404 are used for storing FATs, wherein the FATs record the statuses of the logical addresses. For example, two FATs are stored in the FAT area 404, wherein one of the FATs is used for normal access, and the other FAT is used as a backup FAT.

The logical addresses LBA(F+1)~LBA(C) of the directory area 406 are used for storing a file list, wherein the file list records the description information of files currently stored in the flash memory storage apparatus 100.

The logical addresses LBA(C+1)~LBA(L) of the file area 408 are used for actually storing the contents of the files.

To be specific, after the host system 1000 formats the logical addresses LBA(0)~LBA(L) of the flash memory storage apparatus 100, when the host system 1000 uses the space information (information in the MBR 402, the FAT area 404, and the directory area 406) of the file system 400 to store a file (or data) into the file area 408, the memory management unit 204 writes the data written by the host system 1000 into the logical address actually into a corresponding physical address according to the mapping relationships between the logical address and the physical address.

Figure 5A:
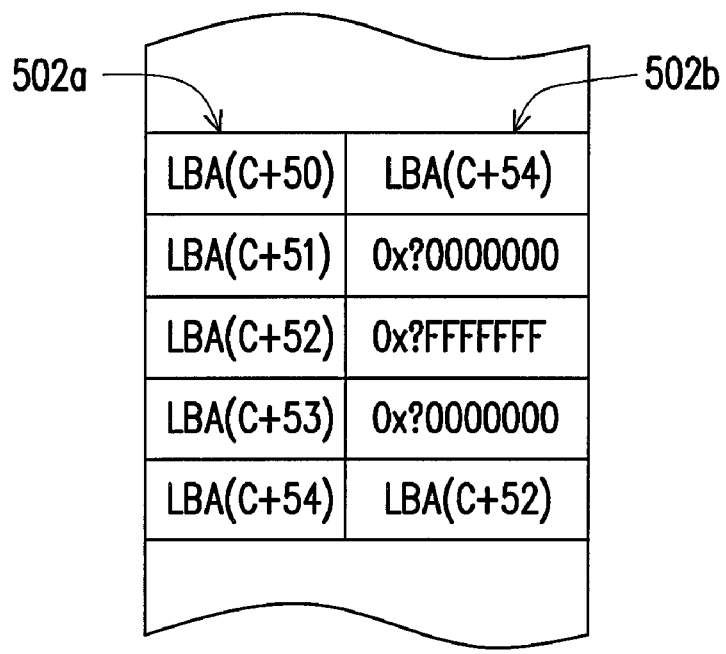
FIG. 5A and FIG. 5B illustrate a part of a FAT and a part of a file list according to an example of the first exemplary embodiment of the present invention.
Figure 5B:
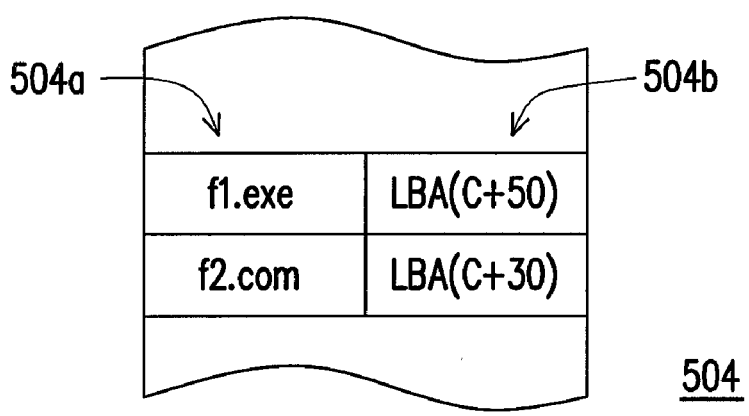

FIG. 5A and FIG. 5B illustrate a part of a FAT and a part of a file list according to an example of the first exemplary embodiment of the present invention.

Referring to FIG. 5A, in the present example, a link value corresponding to each of the logical addresses is sequentially recorded in the logical address index field 502a and the link value field 502b of the FAT 502, wherein each link value in the FAT 502 represents the status of each logical address by using special symbols. For example, taking FAT32 as an example, "0x?0000000" represents that the logical address is an idle logical address (i.e., stores no data), "0 x ?FFFFFF8"–"0x?FFFFFFF" represents that the logical address is the last logical address for storing files.

Referring to FIG. 5B, the file name field 504a and the starting address field 504b of the file list 504 are used for recording the names of files stored in the flash memory storage apparatus 100 and the starting logical addresses for storing these files. It should be understood that the file list 504 is only an example and which may further include a file length field or other attribute fields for describing the information of stored files.

Referring to both FIG. 5A and FIG. 5B, it can be understood based on the space information in the file list 504 that the flash memory storage apparatus 100 stores a file "f1.exe" and a file "f2.com", wherein the starting logical address for storing the file "f1.exe" is the logical address LBA(C+50), and the starting logical address for storing the file "f2.com" is the logical address LBA(C+30). In addition, it can be understood that the content of the file "f1.exe" is sequentially stored in the logical addresses LBA(C+50), LBA(C+54), and LBA(C+52) according to the FAT 502 and the space information in the file list 504.

Figure 6A:
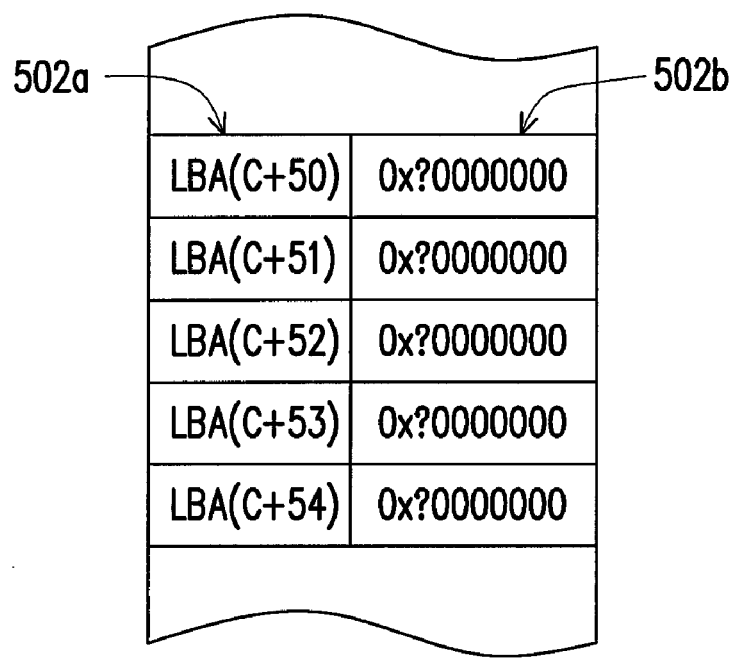
FIG. 6A and FIG. 6B illustrate a part of a FAT and a part of a file list according to another example of the first exemplary embodiment of the present invention.
Figure 6B:
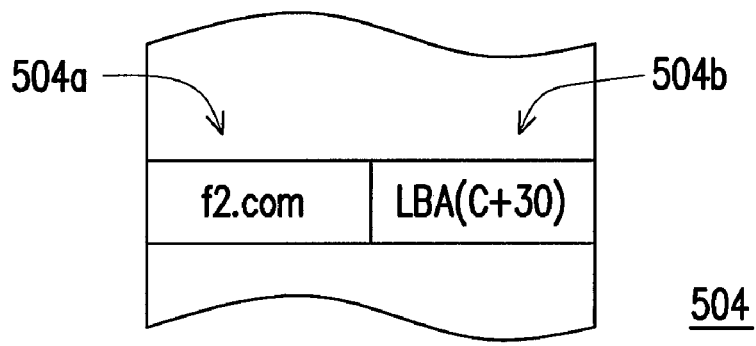

FIG. 6A and FIG. 6B illustrate a part of a FAT and a part of a file list according to another example of the first exemplary embodiment of the present invention.

Referring to FIG. 6A and FIG. 6B, when the host system 1000 deletes the file "f1.exe" under the state illustrated in FIG. 5A and FIG. 5B, the host system 1000 updates the FAT 502 and the file list 504, wherein the link values corresponding to the logical addresses LBA(C+50), LBA(C+54), and LBA(C+52) in the FAT 502 are changed to "0x?0000000", and the information related to the file "f1.exe" is deleted from the file list 504. In this case, the logical addresses LBA(C+50), LBA(C+54), and LBA(C+52) become idle logical addresses. However, it should be understood that when the host system 1000 deletes the file "f1.exe", the memory management unit 204 updates the FAT 502 and the file list 504 in the physical addresses according to instructions of the host system 1000, while the data stored in the physical addresses mapped to the logical addresses LBA(C+50), LBA(C+54), and LBA(C+52) is not deleted. Namely, data stored in the logical addresses LBA(C+50), LBA(C+54), and LBA(C+52) has been deleted in the space information of the file system 400, while the physical addresses mapped to the logical addresses LBA(C+50), LBA(C+54), and LBA(C+52) still contain data. Herein, the logical addresses in the space information of the file system 400 from which the data has been deleted are referred to as deleted logical addresses.

It should be mentioned that in the present exemplary embodiment, a file system analysis unit 1112 is configured in the host system 1000 for analyzing the space information in the file system 400. To be specific, the file system analysis unit 1112 reads the FAT 502 from the flash memory chip 106 and scans the link value corresponding to each logical address to identify which logical addresses are idle logical addresses. Taking FAT32 as an example, when the link value corresponding to a logical address is "0 x?0000000", the file system analysis unit 1112 identifies the logical address as an idle logical address. In particular, the file system analysis unit 1112 sends the information indicating which logical addresses are idle logical addresses to the flash memory controller 104 through the host interface unit 206. In addition, when the memory management unit 204 of the flash memory controller 104 receives the information through the host interface unit 206, the memory management unit 204 identifies the idle logical addresses as deleted logical addresses according to the received information and marks data in the physical addresses mapped to the deleted logical addresses as invalid data. In the present exemplary embodiment, when the memory management unit 204 alternatively uses the physical blocks in the storage area 304 for storing data received from the host system 1000, the memory management unit 204 does not move (or sort) data that are marked as invalid data in those physical addresses. Thereby, the data writing speed is effectively increased.

It should be mentioned that in the present exemplary embodiment, when the file system analysis unit 1112 detects that the host system 1000 updates the FAT 502, the file system analysis unit 1112 executes foregoing procedure to identify the idle logical addresses and sends the identification result to the flash memory controller 104. However, it should be understood that the present invention is not limited thereto, and the file system analysis unit 1112 may also execute foregoing procedure for identifying the idle logical addresses at constant intervals (for example, every 5 minutes) and sends the identification result to the flash memory controller 104. Or, the memory management unit 204 of the flash memory controller 104 may also send a turn-on instruction to request the file system analysis unit 1112 to execute foregoing procedure for identifying the idle logical addresses and send the identification result back.

In the present exemplary embodiment, the file system analysis unit 1112 is configured in the host system 1000 as a hardware form. However, the present invention is not limited thereto, and in another exemplary embodiment of the present invention, the file system analysis unit 1112 may also be installed in the host system 1000 as an application program or a driver program and loaded into the main memory 1104 to be executed when the host system 1000 is started.

Figure 7:
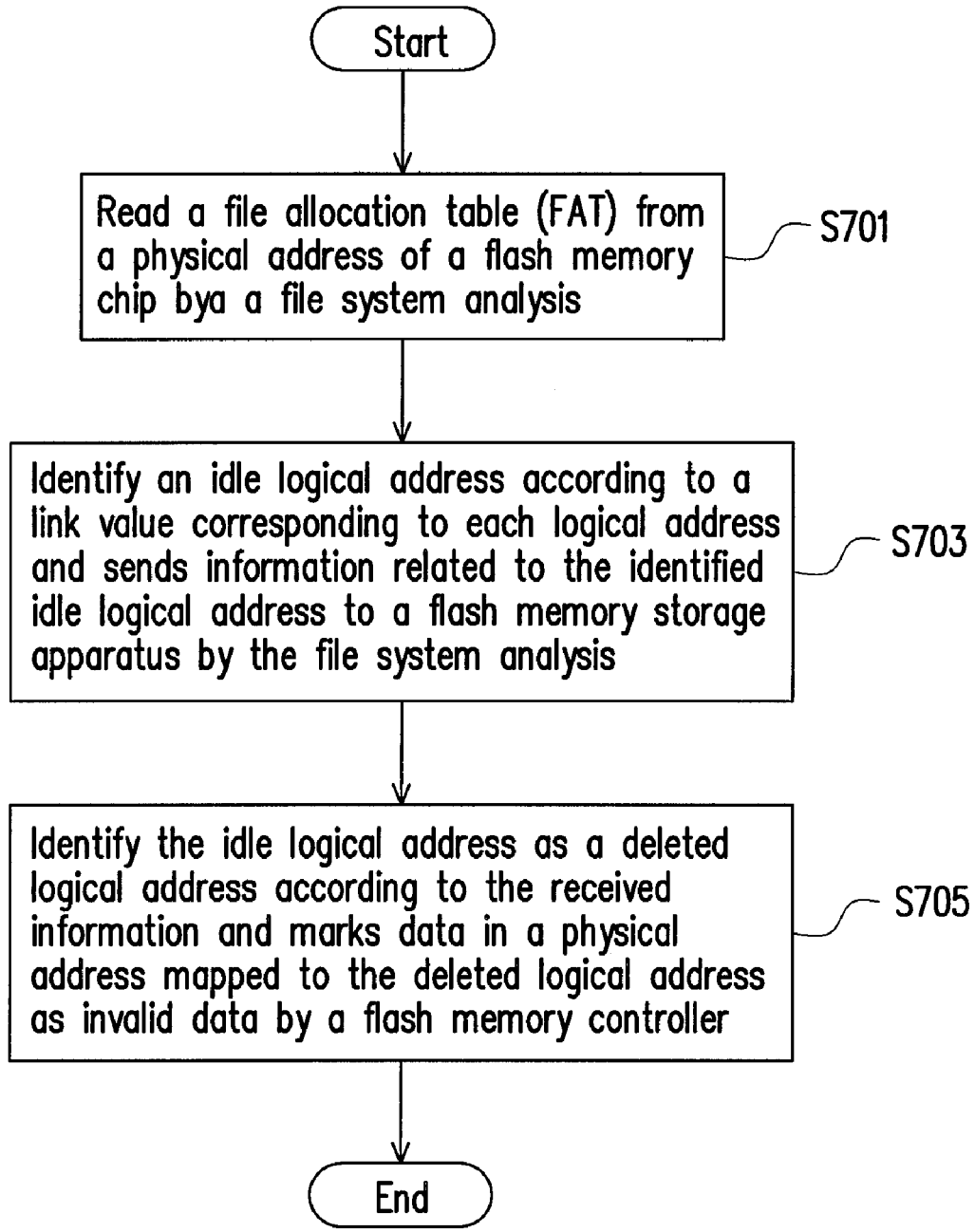
FIG. 7 is a flowchart of a data processing method according to the first exemplary embodiment of the present invention.

FIG. 7 is a flowchart of a data processing method according to the first exemplary embodiment of the present invention.

Referring to FIG. 7, first, in step S701, the file system analysis unit 1112 reads the FAT 502 from the physical addresses of the flash memory chip 106. Then, in step S703, the file system analysis unit 1112 identifies idle logical addresses according to the link value corresponding to each logical address and sends the information related to the identified idle logical addresses to the flash memory storage apparatus 100.

Next, in step S705, the flash memory controller 104 identifies the idle logical addresses as deleted logical addresses according to the received information and marks data in the physical addresses mapped to the deleted logical addresses as invalid data.

[Second Exemplary Embodiment]

Figure 8:
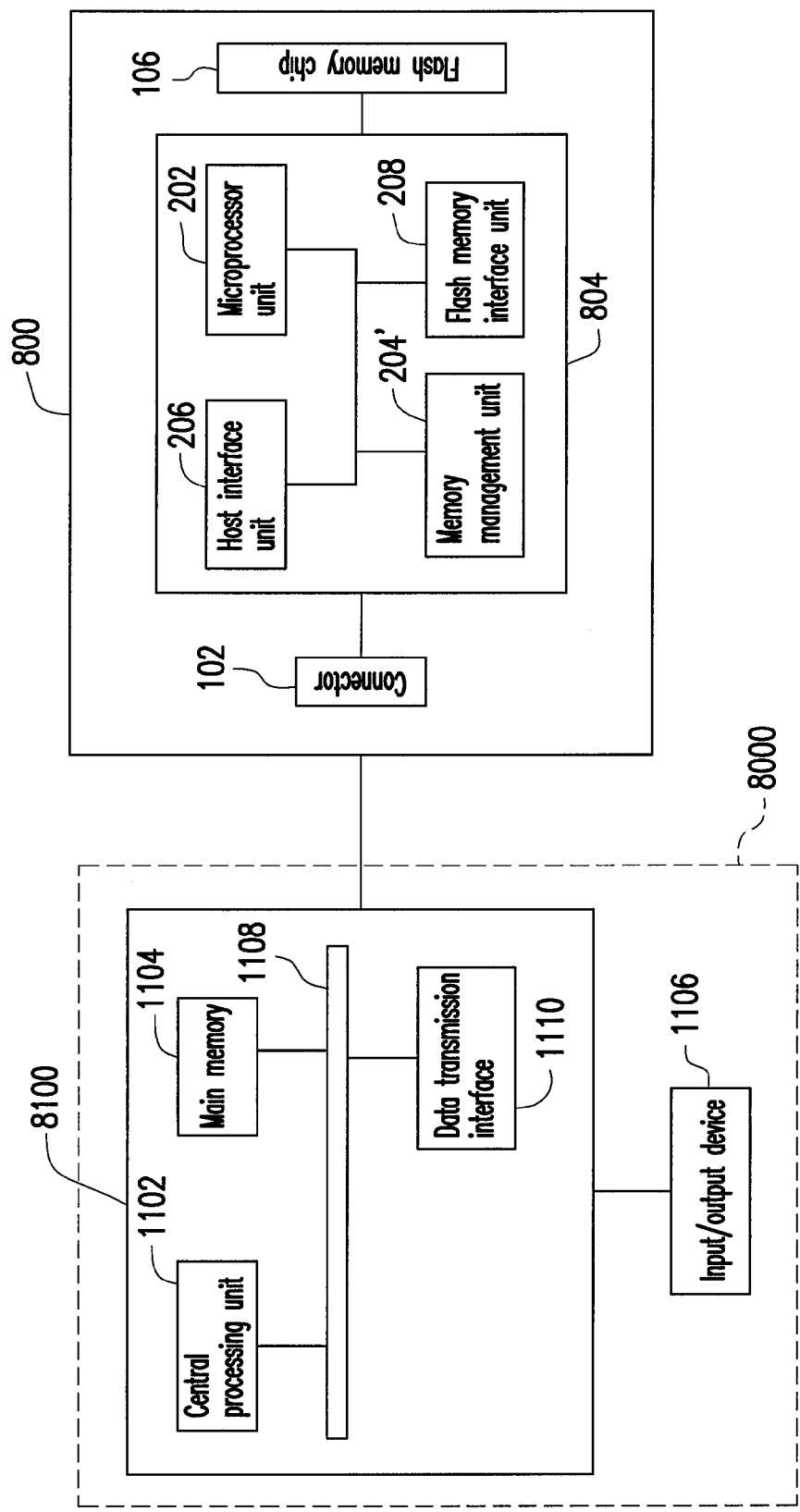
FIG. 8 is a schematic block diagram of a host system and a flash memory storage apparatus according to a second exemplary embodiment of the present invention.

FIG. 8 is a schematic block diagram of a host system and a flash memory storage apparatus according to the second exemplary embodiment of the present invention.

Referring to FIG. 8, the host system 8000 includes a computer 8100 and an I/O device 1106. The computer 8100 includes a CPU 1102, a main memory 1104, a system bus 1108, and a data transmission interface 1110. The flash memory storage apparatus 800 is coupled to other devices of the host system 8000 through the data transmission interface 1110.

The flash memory storage apparatus 800 includes a connector 102, a flash memory controller 804, and a flash memory chip 106, wherein the flash memory controller 804 includes a microprocessor unit 202, a memory management unit 204', a host interface unit 206, and a flash memory interface unit 208. The functions and structures of the connector 102, the flash memory chip 106, the microprocessor unit 202, the host interface unit 206, and the flash memory interface unit 208 have been described in the first exemplary embodiment therefore will not be described herein.

The memory management unit 204' of the flash memory controller 804 is substantially the same as the memory management unit 204, and the difference between the two is that the memory management unit 204 searches for deleted logical addresses according to the information provided by the file system analysis unit 1112 configured in the host system 1000, while the memory management unit 204' searches for deleted logical addresses by directly reading the space information of the file system from the flash memory chip 106.

To be specific, the memory management unit 204' of the flash memory controller 804 reads the FAT 502 from the flash memory chip 106 and scans the link value corresponding to each logical address to identify which logical addresses are idle logical addresses. Taking FAT32 as an example, when the link value corresponding to a logical address is "0 x?0000000", the memory management unit 204' of the flash memory controller 804 identifies the logical address as a deleted logical address and marks data in the physical address mapped to the deleted logical address as an invalid data.

Figure 9:
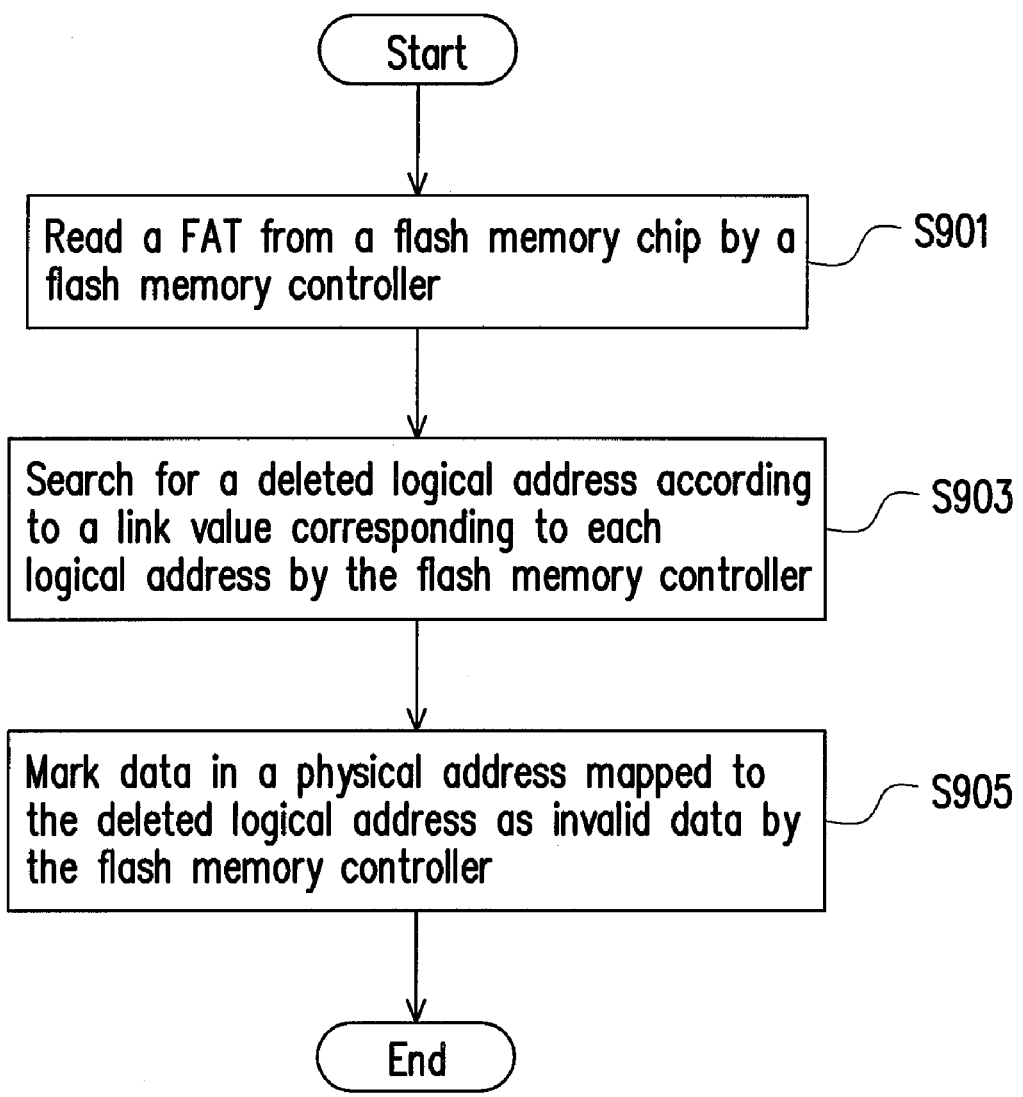
FIG. 9 is a flowchart of a data processing method according to the second exemplary embodiment of the present invention.

FIG. 9 is a flowchart of a data processing method according to the second exemplary embodiment of the present invention.

Referring to FIG. 9, first, in step S901, the flash memory controller 804 reads the FAT 502 from the flash memory chip 106. Then, in step S903, the flash memory controller 804 searches for deleted logical addresses according to the link value corresponding to each logical address, and in step S905, the flash memory controller 804 marks data in the physical addresses mapped to the deleted logical addresses as invalid data.

[Third Exemplary Embodiment]

Figure 10:
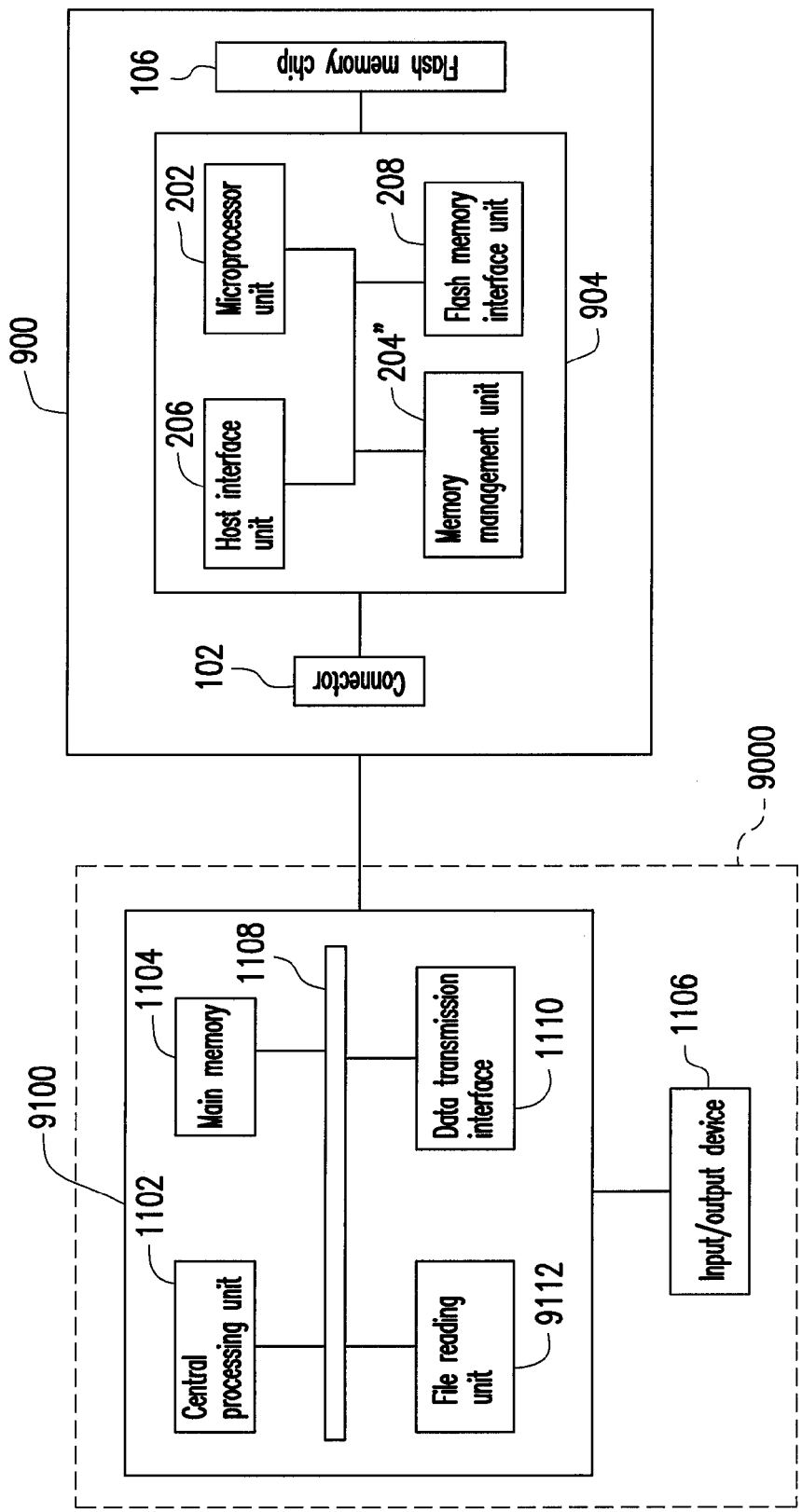
FIG. 10 is a schematic block diagram of a host system and a flash memory storage apparatus according to a third exemplary embodiment of the present invention.

FIG. 10 is a schematic block diagram of a host system and a flash memory storage apparatus according to the third exemplary embodiment of the present invention.

Referring to FIG. 10, the host system 9000 includes a computer 9100 and an I/O device 1106. The computer 9100 includes a CPU 1102, a main memory 1104, a system bus 1108, and a data transmission interface 1110. The flash memory storage apparatus 900 is coupled to other devices of the host system 9000 through the data transmission interface 1110.

The flash memory storage apparatus 900 includes a connector 102, a flash memory controller 904, and a flash memory chip 106, wherein the flash memory controller 904 includes a microprocessor unit 202, a memory management unit 204", a host interface unit 206, and a flash memory interface unit 208. The functions and structures of the connector 102, the flash memory chip 106, the microprocessor unit 202, the host interface unit 206, and the flash memory interface unit 208 have been described in the first exemplary embodiment therefore will not be described herein.

The memory management unit 204" of the flash memory controller 904 is substantially the same as the memory management unit 204, and the difference between the two is that the memory management unit 204 searches for deleted logical addresses according to information provided by the file system analysis unit 1112 configured in the host system 1000, while the memory management unit 204" searches for deleted logical addresses according to the operation of a file reading unit 9112.

The file reading unit 9112 is configured in the host system 9000 and reads files (or data) currently stored in the flash memory storage apparatus 900 according to the space information in the file system 400. To be specific, the file reading unit 9112 reads the files currently stored in the logical addresses according to the file list 504 in the directory area 406 of the file system 400. In particular, when the memory management unit 204" reads data from a physical address according to a host read command received from the file reading unit 9112, the memory management unit 204" records which logical addresses are read and which logical addresses are not read, wherein the memory management unit 204" identifies those logical addresses that are not read by the file reading unit 9112 as deleted logical addresses.

To be more specific, because the file list 504 in the directory area 406 only records those files currently stored in the host system 9000, the file reading unit 9112 finishes accessing the logical addresses storing all the data that is not deleted by the host system after the file reading unit 9112 sequentially reads all the files recorded in the file list 504. In addition, when the file reading unit 9112 reads a file, the memory management unit 204" of the flash memory controller 904 reads the data in the physical addresses according to the mapping relationships between the logical addresses and the physical addresses. In the present exemplary embodiment, at the same time when the file reading unit 9112 reads the logical addresses, the memory management unit 204" records each logical address read by the file reading unit 9112, and after the file reading unit 9112 finishes reading the logical addresses, the memory management unit 204" identifies those logical addresses that are not read by the file reading unit 9112 as deleted logical address according to the logical addresses read by the file reading unit 9112.

It should be mentioned that in the present exemplary embodiment, the file reading unit 9112 executes foregoing reading procedure when the file reading unit 9112 detects that the host system 9000 updates the FAT 502. However, the present invention is not limited thereto, and the file reading unit 9112 may also executes the reading procedure at constant intervals (for example, every 5 minutes), or the memory management unit 204" may send a turn-on instruction to request the file reading unit 9112 to execute the reading procedure.

Figure 11:
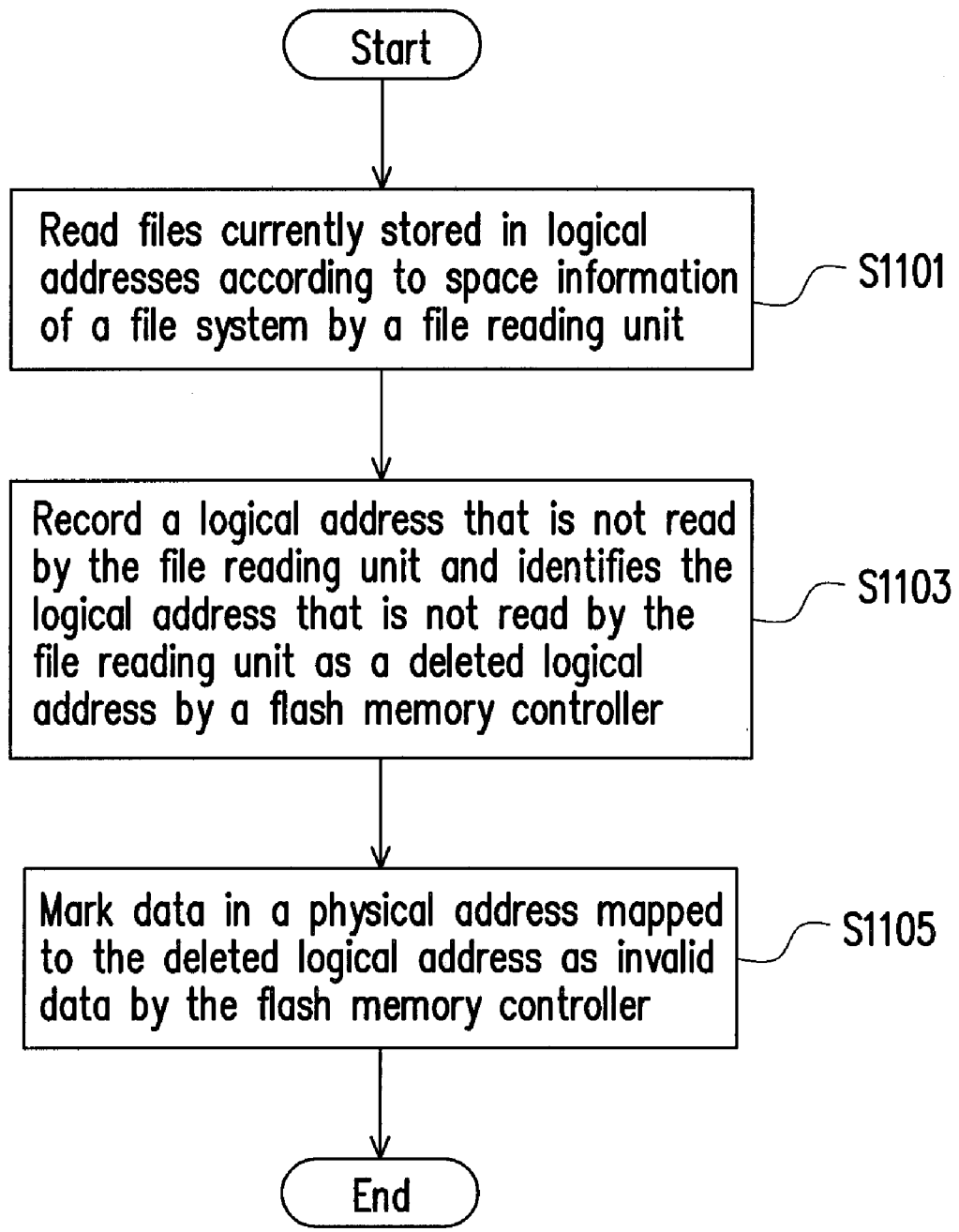
FIG. 11 is a flowchart of a data processing method according to the third exemplary embodiment of the present invention.

FIG. 11 is a flowchart of a data processing method according to the third exemplary embodiment of the present invention.

Referring to FIG. 11, first, in step S1101, the file reading unit 9112 reads the files currently stored in the logical addresses according to the space information in the file system 400. In step S1103, the flash memory controller 904 records the logical addresses that are not read by the file reading unit 9112 and identifies the logical addresses that are not read by the file reading unit 9112 as deleted logical addresses. Finally, in step S1105, the flash memory controller 904 marks data in the physical addresses mapped to the deleted logical addresses as invalid data.

It should be mentioned that in the present exemplary embodiment, the memory management unit 204" identifies the unread logical addresses as deleted logical addresses according to the logical addresses read by the file reading unit 9112. However, in another exemplary embodiment of the present invention, the memory management unit 204" may also identify the deleted logical addresses according to the physical addresses that are not read when the file reading unit 9112 executes the reading procedure. To be specific, as described above, the logical addresses LBA(0)~LBA(L) are mapped to the physical addresses of the physical blocks in the storage area 304. Thus, the memory management unit 204" may also determine which physical addresses in the storage area 304 are not read when the file reading unit 9112 executes the reading procedure and identifies the logical addresses mapped to the unread physical addresses as deleted logical addresses.

As described above, the flash memory storage apparatus provided by exemplary embodiments of the present invention can determine whether the data in a physical address is already deleted by a host system, so that it is not needed to maintain the data deleted by the host system. Thereby, the performance of the flash memory storage apparatus is improved. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash memory storage system, comprising:
a flash memory chip, having a plurality of physical blocks, wherein each of the physical blocks has a plurality of physical addresses;
a connector, configured to couple to a host system;
a flash memory controller, coupled to the flash memory chip and the connector; and
a file system analysis unit, configured in the host system,
wherein the flash memory controller is configured to configure a plurality of logical addresses and map the logical addresses to at least part of the plurality of physical addresses of at least part of the plurality of physical blocks,
wherein the host system uses a file system to access the logical addresses, and the file system has at least one file system space information,
wherein the flash memory controller identifies at least one deleted logical address among the logical addresses and marks data in a physical address mapped to the at least one deleted logical address as invalid data, wherein data stored in the at least one deleted logical address has been deleted in the at least one file system space information,
wherein the file system analysis unit scans the at least one file system space information to identify at least one idle logical address among the logical addresses, and the flash memory controller identifies the at least one idle logical address as the at least one deleted logical address.

2. The flash memory storage system according to claim 1, wherein the at least one file system space information at least comprises a file allocation table (FAT), and the FAT records a link value corresponding to each of the logical addresses,
wherein the file system analysis unit identifies the at least one idle logical address among the logical addresses according to the link value corresponding to each of the logical addresses.

3. The flash memory storage system according to claim 1, wherein the file system analysis unit is configured in the host system as an application program or a driver program.

4. A flash memory storage system, comprising:
a flash memory chip, having a plurality of physical blocks, wherein each of the physical blocks has a plurality of physical addresses;
a connector, configured to couple to a host system; and
a flash memory controller, coupled to the flash memory chip and the connector,
wherein the flash memory controller is configured to configure a plurality of logical addresses and map the logical addresses to at least part of the plurality of physical addresses of at least part of the plurality of physical blocks, wherein the host system uses a file system to access the logical addresses, and the file system has at least one file system space information, wherein the flash memory controller identifies at least one deleted logical address among the logical addresses and marks data in a physical address mapped to the at least one deleted logical address as invalid data, wherein data stored in the at least one deleted logical address has been deleted in the at least one file system space information, wherein the flash memory controller scans the at least one file system space information to identify at least one idle logical address among the logical addresses and identifies the at least one idle logical address as the at least one deleted logical address.

5. The flash memory storage system according to claim 4, wherein the at least one file system space information at least comprises a FAT, and the FAT records a link value corresponding to each of the logical addresses, wherein the flash memory controller identifies the at least one idle logical address among the logical addresses according to the link value corresponding to each of the logical addresses.

6. A flash memory storage system, comprising:

a flash memory chip, having a plurality of physical blocks, wherein each of the physical blocks has a plurality of physical addresses;

a connector, configured to couple to a host system;

a flash memory controller, coupled to the flash memory chip and the connector; and a reading unit, configured in the host system, wherein the flash memory controller is configured to configure a plurality of logical addresses and map the logical addresses to at least part of the plurality of physical addresses of at least part of the plurality of physical blocks, wherein the host system uses a file system to access the logical addresses, and the file system has at least one file system space information, wherein the flash memory controller identifies at least one deleted logical address among the logical addresses and marks data in a physical address mapped to the at least one deleted logical address as invalid data, wherein data stored in the at least one deleted logical address has been deleted in the at least one file system space information, wherein the file reading unit reads all undeleted data from the logical addresses according to the at least one file system space information, and the flash memory controller reads all undeleted data from physical addresses mapped to the logical addresses that are read by the file reading unit.

7. The flash memory storage system according to claim 6, wherein the flash memory controller records at least one logical address that is not read by the file reading unit among the logical addresses and identifies the at least one logical address that is not read by the file reading unit as the at least one deleted logical address.

8. The flash memory storage system according to claim 6, wherein the flash memory controller records at least one unread physical address among the physical addresses of each physical block and identifies at least one logical address mapped to the at least one unread physical address as the at least one deleted logical address.

9. The flash memory storage system according to claim 6, wherein the file reading unit is configured in the host system as an application program or a driver program.

10. A flash memory controller, configured in a flash memory storage apparatus, for managing a flash memory chip of the flash memory storage apparatus, wherein the flash memory chip has a plurality of physical blocks, each of the physical blocks has a plurality of physical addresses, and the flash memory storage apparatus is coupled to a host system, the flash memory controller comprising:

a microprocessor unit;

a flash memory interface unit, coupled to the microprocessor unit, wherein the flash memory interface unit is configured to couple to the flash memory chip;

a host interface unit, coupled to the microprocessor unit, wherein the host interface unit is configured to couple to the host system; and a memory management unit, coupled to the microprocessor unit, wherein the memory management unit configures a plurality of logical addresses and mapping the logical addresses to at least part of the plurality of physical addresses of at least part of the plurality of physical blocks, wherein the host system uses a file system to access the logical addresses, and the file system has at least one file system space information, wherein the memory management unit identifies at least one deleted logical address among the logical addresses and marks data in a physical address mapped to the at least one deleted logical address as invalid data, wherein data stored in the at least one deleted logical address has been deleted in the at least one file system space information, wherein the host system comprises a file system analysis unit, wherein when the file system analysis unit scans the at least one file system space information to identify at least one idle logical address among the logical addresses and sends information related to the at least one idle logical address to the memory management unit through the host interface unit, the memory management unit identifies the at least one idle logical address as the at least one deleted logical address.

11. The flash memory controller according to claim 10, wherein the at least one file system space information at least comprises a FAT, and the FAT records a link value corresponding to each of the logical addresses, wherein the file system analysis unit identifies the at least one idle logical address among the logical addresses according to the link value corresponding to each of the logical addresses.

12. A flash memory controller, configured in a flash memory storage apparatus, for managing a flash memory chip of the flash memory storage apparatus, wherein the flash memory chip has a plurality of physical blocks, each of the physical blocks has a plurality of physical addresses, and the flash memory storage apparatus is coupled to a host system, the flash memory controller comprising:

a microprocessor unit;

a flash memory interface unit, coupled to the microprocessor unit, wherein the flash memory interface unit is configured to couple to the flash memory chip;

a host interface unit, coupled to the microprocessor unit, wherein the host interface unit is configured to couple to the host system; and a memory management unit, coupled to the microprocessor unit, wherein the memory management unit configures a plurality of logical addresses and mapping the logical addresses to at least part of the plurality of physical addresses of at least part of the plurality of physical blocks, wherein the host system uses a file system to access the logical addresses, and the file system has at least one file system space information, wherein the memory management unit identifies at least one deleted logical address among the logical addresses and marks data in a physical address mapped to the at least one deleted logical address as invalid data, wherein data stored in the at least one deleted logical address has been deleted in the at least one file system space information, wherein the memory management unit scans the at least one file system space information to identify at least one idle logical address among the logical addresses and identifies the at least one idle logical address as the at least one deleted logical address.

13. The flash memory controller according to claim 12, wherein the at least one file system space information at least comprises a FAT, and the FAT records a link value corresponding to each of the logical addresses, wherein the memory management unit identifies the at least one idle logical address among the logical addresses according to the link value corresponding to each of the logical addresses.

14. A flash memory controller, configured in a flash memory storage apparatus, for managing a flash memory chip of the flash memory storage apparatus, wherein the flash memory chip has a plurality of physical blocks, each of the physical blocks has a plurality of physical addresses, and the flash memory storage apparatus is coupled to a host system, the flash memory controller comprising:

a microprocessor unit;

a flash memory interface unit, coupled to the microprocessor unit, wherein the flash memory interface unit is configured to couple to the flash memory chip;

a host interface unit, coupled to the microprocessor unit, wherein the host interface unit is configured to couple to the host system; and a memory management unit, coupled to the microprocessor unit, wherein the memory management unit configures a plurality of logical addresses and mapping the logical addresses to at least part of the plurality of physical addresses of at least part of the plurality of physical blocks, wherein the host system uses a file system to access the logical addresses, and the file system has at least one file system space information, wherein the memory management unit identifies at least one deleted logical address among the logical addresses and marks data in a physical address mapped to the at least one deleted logical address as invalid data, wherein data stored in the at least one deleted logical address has been deleted in the at least one file system space information, wherein the host system comprises a file reading unit, wherein when the file reading unit reads all undeleted data from the logical addresses according to the at least one file system space information, the memory management unit reads all undeleted data from physical addresses mapped to the logical addresses that are read by the file reading unit.

15. The flash memory controller according to claim 14, wherein the memory management unit records at least one logical address that is not read by the file reading unit among the logical addresses and identifies the at least one logical address that is not read by the file reading unit as the at least one deleted logical address.

16. The flash memory controller according to claim 14, wherein the memory management unit records at least one unread physical address among the physical addresses of each physical block and identifies at least one logical address mapped to the at least one unread physical address as the at least one deleted logical address.

17. A data processing method, for managing a flash memory chip, wherein the flash memory chip has a plurality of physical blocks, and each of the physical blocks has a plurality of physical addresses, the data processing method comprising:

providing a flash memory controller;

configuring a plurality of logical addresses and mapping the logical addresses to at least part of the plurality of physical addresses of at least part of the plurality of physical blocks, wherein a host system uses a file system to access the logical addresses, and the file system has at least one file system space information;

configuring a file system analysis unit in the host system;

scanning the at least one file system space information by using the file system analysis unit to identify at least one idle logical address among the logical addresses;

identifying the at least one idle logical address as at least one deleted logical address, wherein data stored in the at least one deleted logical address has been deleted in the at least one file system space information; and marking data in physical address mapped to the at least one deleted logical address as invalid data by using the flash memory controller.

18. The data processing method according to claim 17, wherein the step of scanning the at least one file system space information by using the file system analysis unit to identify the at least one idle logical address among the logical addresses comprises:

reading a FAT in the at least one file system space information, wherein the FAT records a link value corresponding to each of the logical addresses; and identifying the at least one idle logical address among the logical addresses according to the link value corresponding to each of the logical addresses.

19. A data processing method, for managing a flash memory chip, wherein the flash memory chip has a plurality of physical blocks, and each of the physical blocks has a plurality of physical addresses, the data processing method comprising:

providing a flash memory controller;

configuring a plurality of logical addresses and mapping the logical addresses to at least part of the plurality of physical addresses of at least part of the plurality of physical blocks, wherein a host system uses a file system to access the logical addresses, and the file system has at least one file system space information;

scanning the at least one file system space information by using the flash memory controller to identify at least one idle logical address among the logical addresses;

identifying the at least one idle logical address as at least one deleted logical address; and marking data in physical address mapped to the at least one deleted logical address as invalid data by using the flash memory controller.

20. The data processing method according to claim 19, wherein the step of scanning the at least one file system space information by using the flash memory controller to identify the at least one idle logical address among the logical addresses comprises:

reading a FAT in the at least one file system space information by using the flash memory controller, wherein the FAT records a link value corresponding to each of the logical addresses; and identifying the at least one idle logical address among the logical addresses according to the link value corresponding to each of the logical addresses.

21. A data processing method, for managing a flash memory chip, wherein the flash memory chip has a plurality of physical blocks, and each of the physical blocks has a plurality of physical addresses, the data processing method comprising:

providing a flash memory controller;

configuring a plurality of logical addresses and mapping the logical addresses to at least part of the plurality of physical addresses of at least part of the plurality of physical blocks, wherein a host system uses a file system to access the logical addresses, and the file system has at least one file system space information;

configuring a file reading unit in the host system;

reading all undeleted data from the logical addresses according to the at least one file system space information by using the file reading unit, wherein the flash memory controller reads all undeleted data from physical addresses mapped to the logical addresses that are read by the file reading unit;

recording at least one logical address that is not read by the file reading unit among the logical addresses by using the flash memory controller, and identifying the at least one logical address that is not read by the file reading unit as at least one deleted logical address; and marking data in physical address mapped to the at least one deleted logical address as invalid data by using the flash memory controller.

22. A data processing method, for managing a flash memory chip, wherein the flash memory chip has a plurality of physical blocks, and each of the physical blocks has a plurality of physical addresses, the data processing method comprising:

providing a flash memory controller;

configuring a plurality of logical addresses and mapping the logical addresses to at least part of the plurality of physical addresses of at least part of the plurality of physical blocks, wherein a host system uses a file system to access the logical addresses, and the file system has at least one file system space information;

configuring a file reading unit in the host system;

reading all undeleted data from the logical addresses according to the at least one file system space information by using the file reading unit, wherein the flash memory controller reads all undeleted data from physical addresses mapped to the at least one logical addresses that are read by the file reading unit;

recording at least one physical address that is not read by the flash memory controller among the physical addresses of each physical block, and identifying at least one logical address mapped to the at least one physical address that is not read by the flash memory controller as at least one deleted logical address; and marking data in physical address mapped to the at least one deleted logical address as invalid data by using the flash memory controller.

* * * * *